(12) United States Patent
Cha et al.

(10) Patent No.: US 12,252,178 B2
(45) Date of Patent: Mar. 18, 2025

(54) HOOD-INTEGRATED VEHICLE BODY (71) Applicants: HYUNDAI MOTOR COMPANY, Seoul (KR); KIA CORPORATION, Seoul (KR); HYUNDAI MOBIS CO., LTD., Seoul (KR)

(72) Inventors: Dong Eun Cha, Hwaseong-si (KR); Jin Young Yoon, Gimpo-si (KR); Hong Heui Lee, Suwon-si (KR); Seong Kwon Kim, Hwaseong-si (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 345 days.

(21) Appl. No.: 17/830,989

(22) Filed: Jun. 2, 2022

(65) Prior Publication Data
US 2023/0056479 A1 Feb. 23, 2023

(30) Foreign Application Priority Data
Aug. 17, 2021 (KR) ........................ 10-2021-0108313

(51) Int. Cl.
*B62D 25/12* (2006.01)
*E05B 83/24* (2014.01)

(52) U.S. Cl.
CPC .............. *B62D 25/12* (2013.01); *E05B 83/24* (2013.01)

(58) Field of Classification Search
CPC ........ B62D 25/10; B62D 25/12; B62D 25/08; B62D 25/105; B62D 29/043; B62D 25/087; E05B 83/24; E05B 47/0003; E05B 53/003; E05B 85/107; B60Y 2200/91; B60Y 2304/03; B60Y 2304/072; B60R 2019/1886; B60R 19/52; B60R 2019/525; B60R 2019/522; B60R 2019/527;
(Continued)

(56) References Cited

U.S. PATENT DOCUMENTS 6,711,859 B2 * 3/2004 Bell ..................... H05K 5/0008
49/501
6,991,055 B2 * 1/2006 White .................... B62D 25/12
180/69.2
(Continued)

FOREIGN PATENT DOCUMENTS

KR 2007-0030971 A 3/2007

*Primary Examiner* — Lori Lyjak
(74) *Attorney, Agent, or Firm* — MCDONNELL BOEHNEN HULBERT & BERGHOFF LLP (57) ABSTRACT

A hood-integrated vehicle body in which a hood, a bumper, and a fender are integrally formed into a single component so as to reduce the weight thereof is disclosed. The hood-integrated vehicle body includes a front vehicle body part, which is constructed such that a hood is integrally and rotatably connected to a front portion of the front vehicle body part and is openable at a rear side thereof, a lifting unit mounted to the front part of the vehicle so as to rotate the hood, and a locking unit, which is mounted to the front part of the vehicle so as to selectively engage the hood with the front part of the vehicle such that the engagement of the hood is released so as to allow the hood to be opened by means of the lifting unit upon manipulation for opening the hood.

11 Claims, 10 Drawing Sheets

(58) Field of Classification Search
CPC ............ B60R 13/00; B60R 2021/0039; B60R 2021/0051; B60R 2021/0053
USPC ...... 296/193.11, 193.1, 193.09, 198, 193.01, 296/193.04; 180/69.2, 69.21
See application file for complete search history.

(56) References Cited

U.S. PATENT DOCUMENTS

| | | | | |
|---|---|---|---|---|
| 7,287,797 B1* | 10/2007 | Belloso | ................. | B62D 21/03 296/193.07 |
| 2005/0001452 A1* | 1/2005 | White | .................... | B62D 24/02 296/193.11 |

\* cited by examiner

HOOD-INTEGRATED VEHICLE BODY

CROSS REFERENCE TO RELATED APPLICATIONS

This application claims the priority benefit of Korean Patent Application No. 10-2021-0108313, filed on Aug. 17, 2021, in the Korean Intellectual Property Office, the disclosure of which is incorporated herein by reference.

BACKGROUND

1. Field

The present disclosure relates to a hood-integrated vehicle body, in which a hood, a bumper, and a fender are integrated into a single component to reduce the weight thereof, and the hood is opened or closed depending on whether or not the hood is locked.

2. Description of the Related Art

In general, a vehicle body is provided at a front portion thereof with a hood. Recently, because environment-friendly vehicles, which are not provided with engines, for example, electrical vehicles, are extensively used, and because it is possible to reduce the size of devices for driving the vehicles, a portion of an engine compartment serves as a front trunk for accommodating baggage therein, and a hood configured to open and close the front trunk is provided.

Because such a hood is configured such that a bracket assembled with a hood panel and a bracket assembled with a cowl panel are connected to each other via a hinge, the hood is supported by the vehicle body via the hinge to be opened and closed while being rotated.

However, because the hood is made of a steel plate having high rigidity and individual hinges are attached to the plate-shaped hood, it is difficult to change the structure of the hood. Furthermore, because the hood is strongly engaged with a hood latch due to its own weight when the hood is closed, a large impact is applied to a vehicle when closing the hood.

In addition, the weight of the hood is increased due to various bracket and hinge structures required in order to mount the hood. Hence, conventional hood structures are difficult to apply to environment-friendly vehicles.

Details described as the background art are intended merely for the purpose of promoting an understanding of the background of the present disclosure and should not be construed as an acknowledgment of the prior art that is already known to those of ordinary skill in the art.

SUMMARY

Therefore, the present disclosure has been made in view of the above problems, and it is an object of the present disclosure to provide a hood-integrated vehicle body, in which a hood, a bumper, and a fender are integrated into a single component to reduce the weight thereof, and in which the hood and the bumper are integrally formed to allow the rear end of the hood to be opened and closed.

In accordance with an aspect of the present disclosure, the above and other objects can be accomplished by a hood-integrated vehicle body including a front vehicle body part, which is constructed such that a hood configured to open and close an internal space in a front part of a vehicle is integrally and rotatably connected to a front portion of the front vehicle body part and is openable at a rear side thereof, a lifting unit mounted to the front part of the vehicle to rotate the hood in a direction in which the hood is opened, and a locking unit, which is mounted to the front part of the vehicle so as to selectively engage the hood with the front part of the vehicle such that the engagement of the hood is released so as to allow the hood to be opened by means of the lifting unit upon manipulation for opening the hood.

The front vehicle body part may be constructed such that the hood, a bumper, and a fender are integrally formed from a plastic material through injection molding.

The locking unit may include a grille mounted to the front vehicle body part to be moved in forward and backward directions, a locking device, which is mounted to the grille and is selectively engaged with the front vehicle body part, and a cable, which is connected both to the grille and to the locking unit and allows the locking unit to be disengaged from the front vehicle body part when the grille is moved forwards.

The front vehicle body part may be provided at a front end thereof with a slide space within which the grille is movable in forward and backward directions.

The grille may be provided with a locking groove portion, and the slide space in the front vehicle body part may be provided therein with a locking pin, which is inserted into or separated from the locking groove portion as desired by a user.

The front vehicle body part may be provided with a guide hole portion behind the slide space, the slide space may be provided therein with an elastic body configured to provide elastic force for moving the grille forwards, and the grille may be provided with a guide, which extends backwards through the guide hole portion and which includes a protrusion formed at an end thereof, which catches on the guide hole portion when the grille is moved forwards by a predetermined distance.

The locking device may include a hook portion, which is connected to the cable so as to be slid by the pulling force caused by forward and backward movement of the grille, and the front vehicle body part may be provided at the rear end thereof with a catch portion, which is selectively engaged with the hook portion.

The hook portion may include a plurality of hook portions, which are provided at lateral sides of a rear end of the hood, and the catch portion may include a plurality of catch portions, which are provided at lateral sides of the rear end of the front vehicle body part.

The locking device may further include an actuation portion, which is mounted to the hood and is connected to the cable, the actuation portion being configured to move and separate the hook portion from the catch portion upon application of pulling force caused by forward movement of the grille.

The lifting unit may include an elastic portion, which is provided at a rear end of the front vehicle body part and is in contact with a rear end of the hood so as to provide elastic force in a direction in which the hood is opened.

The lifting unit may include a lifting device, which is rotatably connected at one end thereof to the front vehicle body part and at a remaining end thereof to the hood so as to push and rotate the hood when the hood is rotated in a direction in which the hood is opened.

BRIEF DESCRIPTION OF THE FIGURES

The above and other objects, features and other advantages of the present disclosure will be more clearly under

DETAILED DESCRIPTION

Hereinafter, a hood-integrated vehicle body according to a preferred embodiment of the present disclosure will be described with reference to the accompanying drawings.

Figure 1:
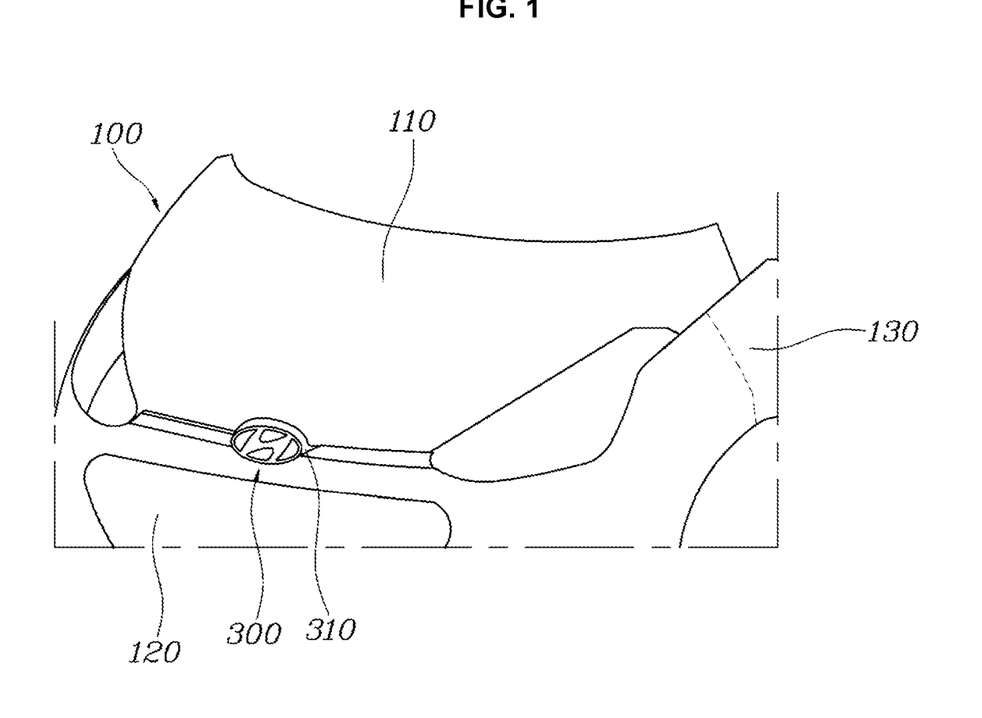
- FIG. 1 is a view illustrating a hood-integrated vehicle body according to an embodiment of the present disclosure.
Figure 2:
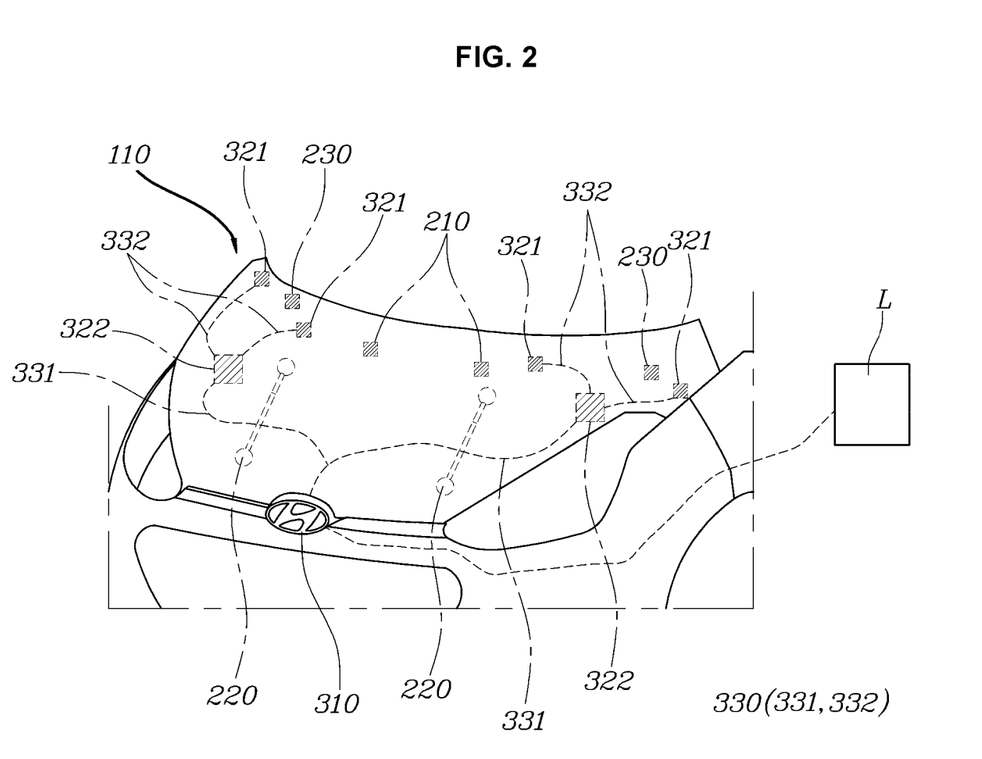
FIG. 2 is a view illustrating a front vehicle body part, a lifting unit, and a locking device of the hood-integrated vehicle body shown in FIG. 1.
Figure 3:
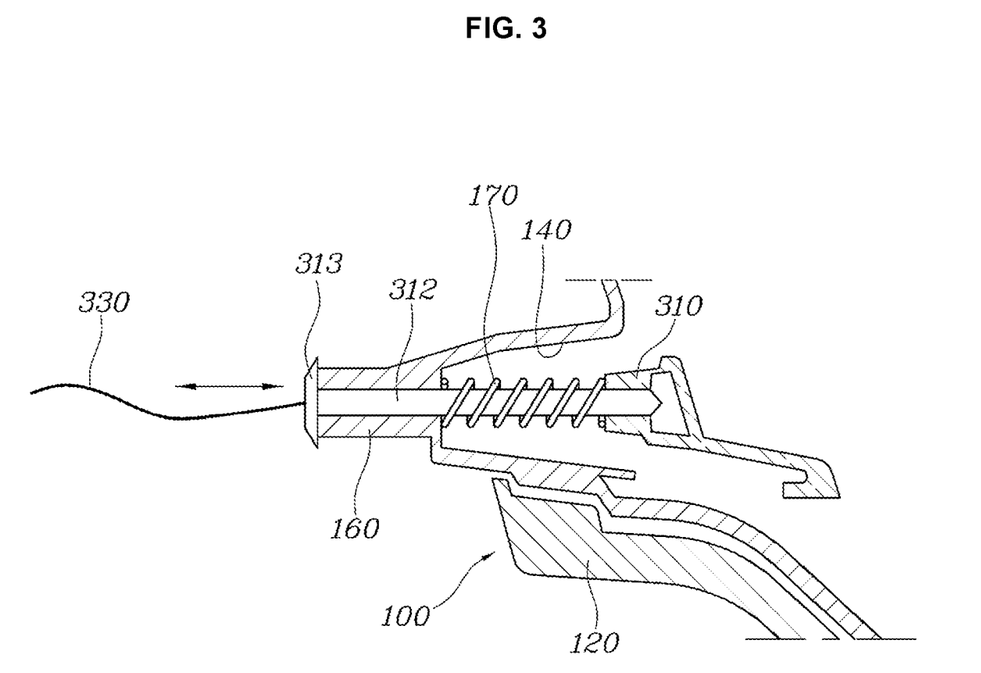
FIG. 3 is a view illustrating a grille of the locking device.
Figure 4:
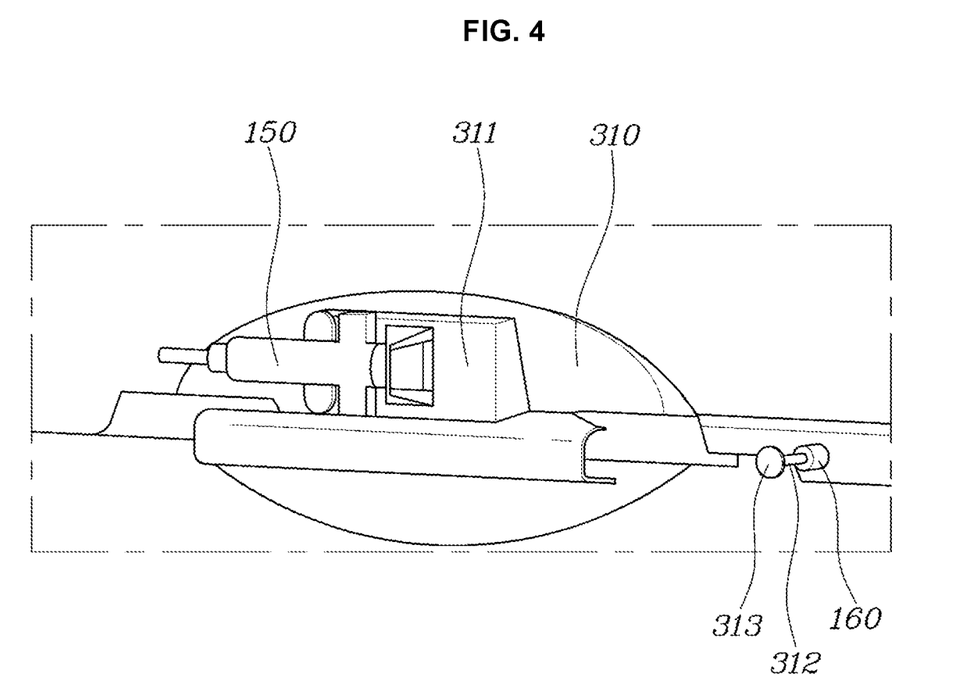
FIG. 4 is a view illustrating a locking groove portion of the locking device and a locking pin of the front vehicle body part.
Figure 5:
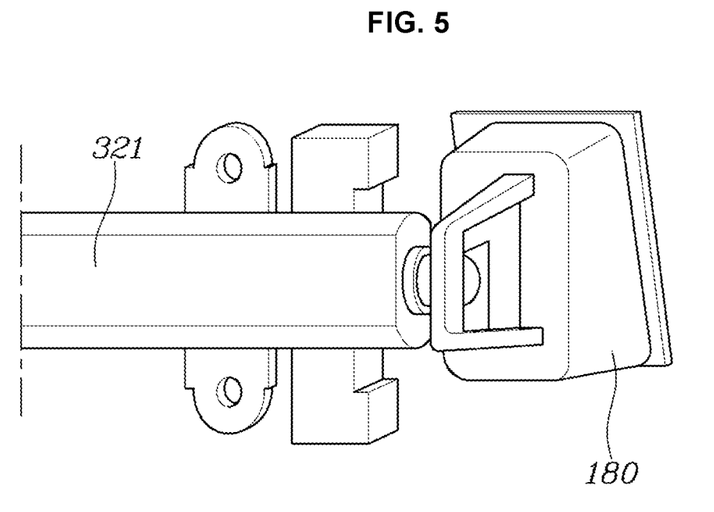
FIG. 5 is a view illustrating a hook portion of the locking device and a catch portion of the front vehicle body part.
Figure 6:
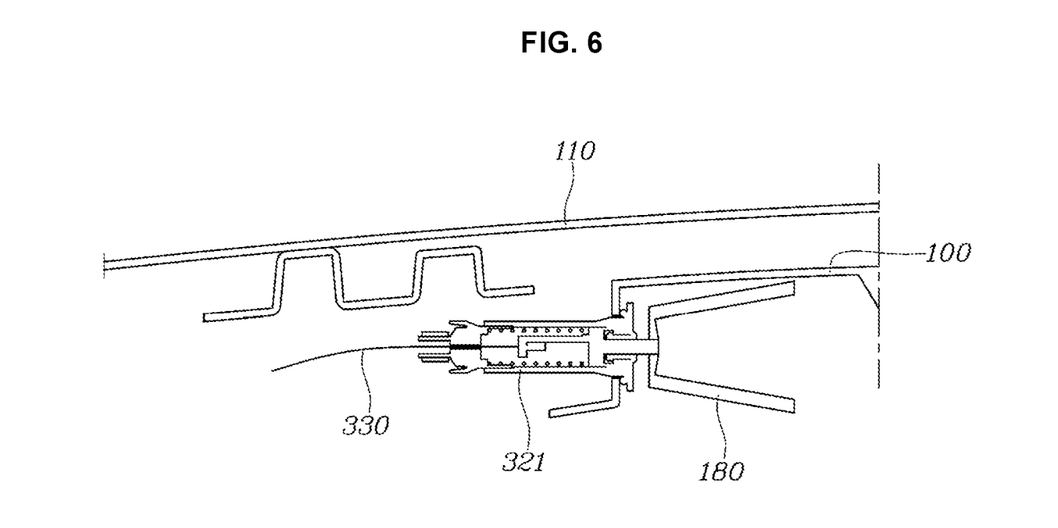
FIG. 6 is a view illustrating operation of the hook portion of the locking device and the catch portion of the front vehicle body part.
Figure 7:
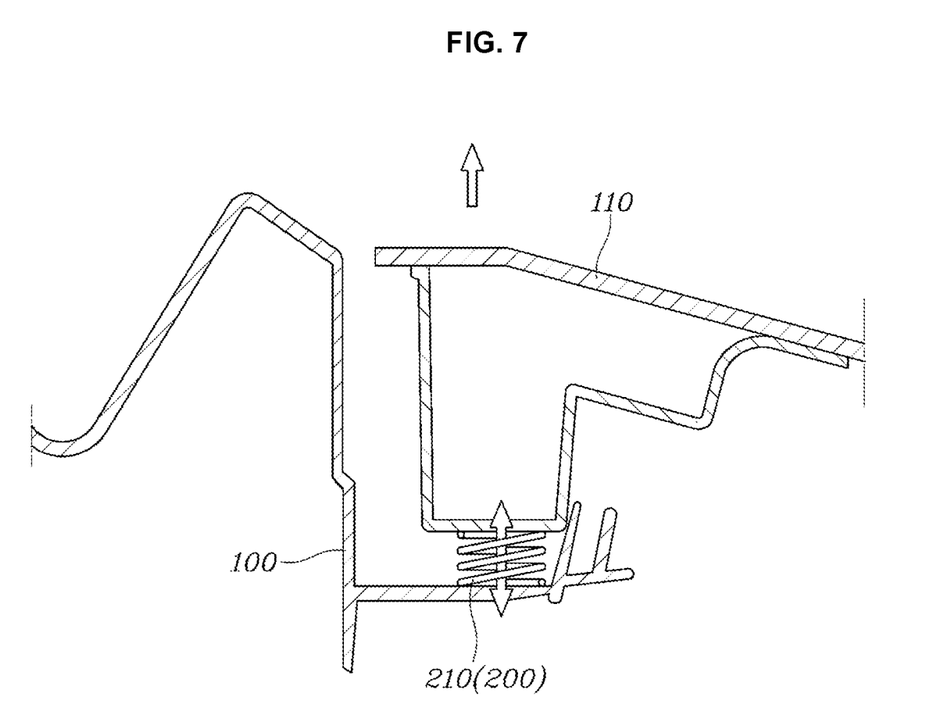
FIG. 7 is a view illustrating an elastic portion of a lifting unit.
Figure 8:
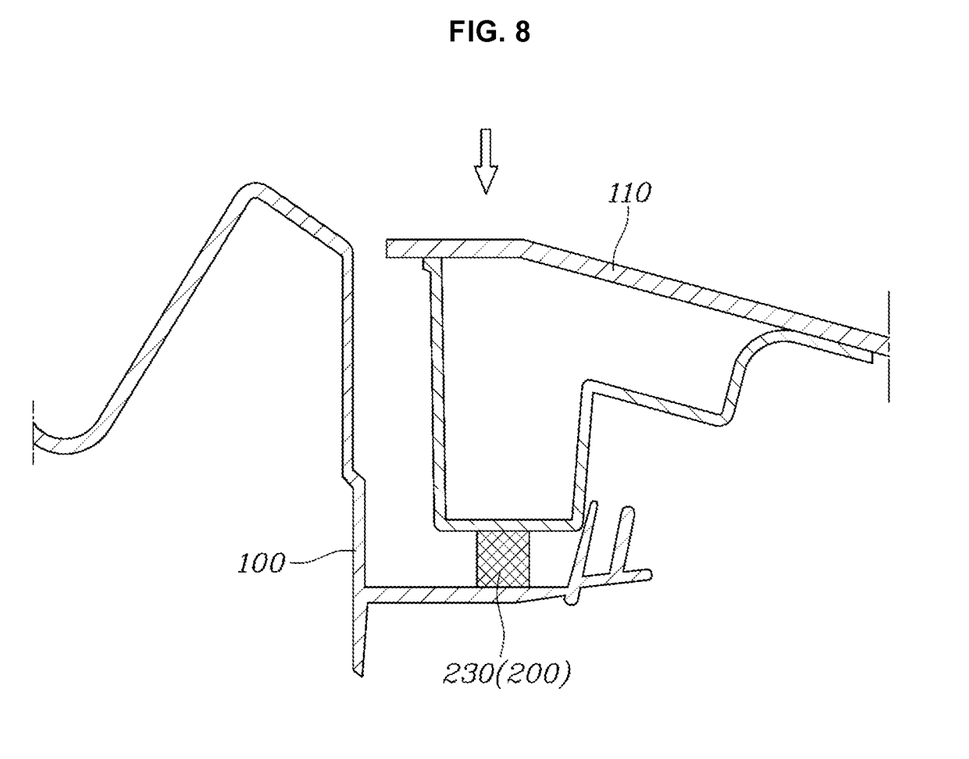
FIG. 8 is a view illustrating an impact-absorbing member of the lifting unit.
Figure 9:
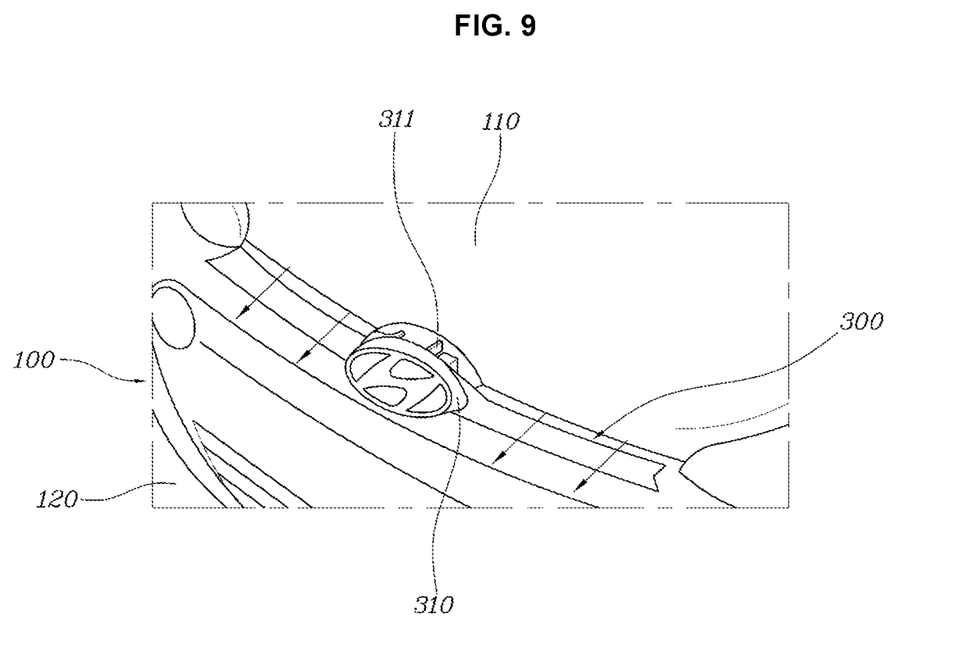
FIG. 9 is a view illustrating operation of the grille.
Figure 10:
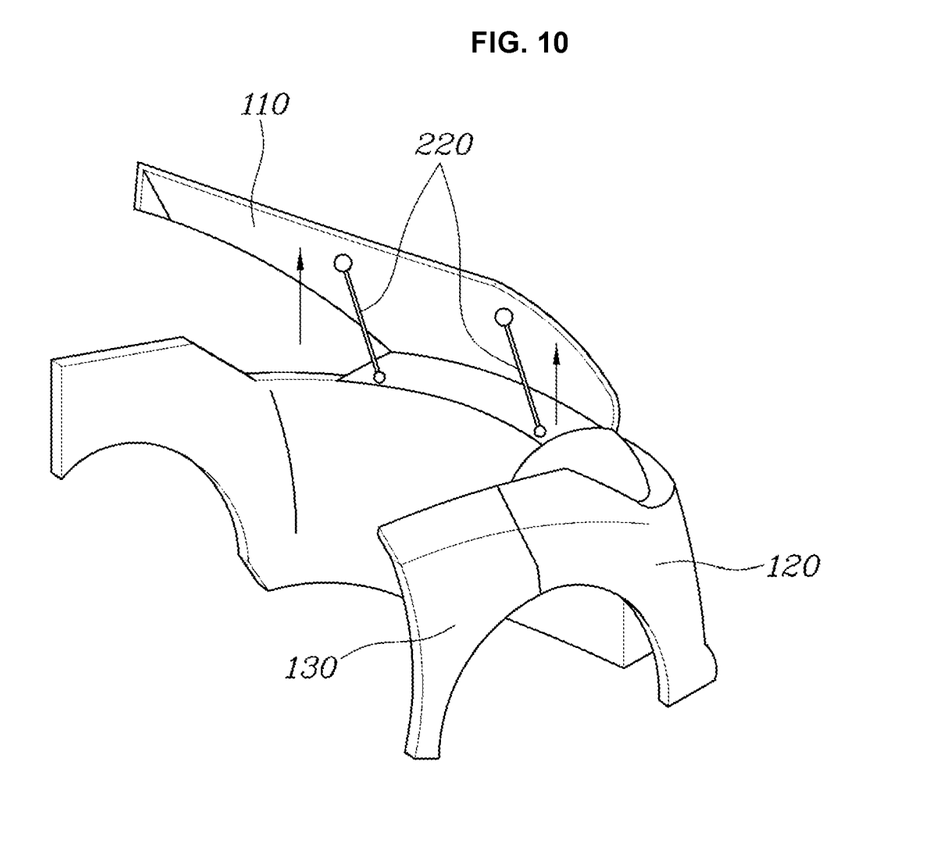
FIG. 10 is a view illustrating a lifting action of the hood.

FIG. 1 is a view illustrating a hood-integrated vehicle body according to an embodiment of the present disclosure. FIG. 2 is a view illustrating a front vehicle body part, a lifting unit, and a locking device of the hood-integrated vehicle body shown in FIG. 1. FIG. 3 is a view illustrating a grille of the locking device. FIG. 4 is a view illustrating a locking groove portion of the locking device and a locking pin of the front vehicle body part. FIG. 5 is a view illustrating a hook portion of the locking device and a catch portion of the front vehicle body part. FIG. 6 is a view illustrating operation of the hook portion of the locking device and the catch portion of the front vehicle body part. FIG. 7 is a view illustrating an elastic portion of a lifting unit. FIG. 8 is a view illustrating an impact-absorbing member of the lifting unit. FIG. 9 is a view illustrating operation of the grille. FIG. 10 is a view illustrating a lifting action of the hood.

As illustrated in FIGS. 1 and 2, the hood-integrated vehicle body according to an embodiment of the present disclosure includes a front vehicle body part 100, in which a hood 110 is integrally and rotatably connected to a front portion of the front vehicle body part 100 to open and close an engine compartment or a front trunk of a vehicle, and a locking unit 300, which is mounted to the front vehicle body part 100 to selectively lock the hood 110 to the front vehicle body part 100. The locking unit 300 is also configured to release the locked state of the hood 110 to allow the hood 110 to be opened by a lifting unit 200 when opening the hood 110.

The front vehicle body part 100 according to the embodiment of the present disclosure is constructed such that the hood 110 is configured to open and close the engine compartment or the front trunk, a bumper 120 is configured to absorb impacts applied to the front portion of the vehicle and to realize an attractive design, and a fender 130, which surrounds a wheel, are integrally formed with one another. The front vehicle body part 100 is made of a plastic material to reduce the weight thereof.

In the construction of a conventional front vehicle body part, because the hood 110, the bumper 120, and the fender 130 are formed separately and are assembled with one another via brackets or hinges, manufacturing efficiency is deteriorated. However, because the front vehicle body part 100 according to the embodiment of the present disclosure includes the hood 110, the bumper 120, and the fender 130, which are integrally formed with one another from a plastic material, the front vehicle body part 100 may be easily manufactured by injection molding.

Here, although the front vehicle body part 100 is constructed such that the hood 110 is integrally formed with the bumper 120, the hood 110 is rotatable vertically to open and close the engine compartment or the front trunk through deformation of the plastic material thereof.

In order to ensure sufficient rigidity, a high-strength plastic material may be applied to the inner side of the hood 110.

Because the hood 110 is connected to the bumper 120 to be openable backwards, the bumper 120 and the fender 130 may be integrally formed with each other, and may be shaped to have a desired form.

The front vehicle body part 100 is provided with the lifting unit 200, which is configured to allow the hood 110 to be rotated and opened. Accordingly, because the hood 110 is rotatable relative to the front vehicle body part 100 to be opened by means of the lifting unit 200, it is possible to automate the action of opening the hood 110. The lifting unit 200 may be embodied by a spring or a lifting device 220, and may be mounted to the rear end of the front vehicle body part 100.

The front vehicle body part 100 is provided with the locking unit 300 configured to maintain the closed position of the hood 110. The locking unit 300 is mounted to the front vehicle body part 100 and the hood 110 such that, when the hood 110 is rotated in the closing direction and is fitted with the front vehicle body part 100, the hood 110 is maintained in the closed position by the coupling between the hood 110 and the front vehicle body part 100. When the hood 110 is manipulated so as to be opened, the locking unit 300 releases the locked state of the hood 110 to allow the hood to be opened by means of the lifting unit 200.

Hereinafter, the hood-integrated front vehicle body part according to the embodiment of the present disclosure will be described in detail.

As illustrated in FIGS. 3 and 4, the locking unit 300 includes a grille 310, which is mounted to the front vehicle body part 100 to be movable in forward and backward directions, a locking device 320, which is connected to the grille 310 to be selectively engaged with the front vehicle body part 100, and a cable 330, which is connected both to the grille 310 and to the locking device 320 to allow the locking device 320 to be disengaged from the front vehicle body part 100 when the grille 310 is moved forwards.

In other words, the locking unit 300 is composed of the grille 310, the locking device 320, and the cable 330 such that, when pulling force is applied to the cable 330 by forward movement of the grille 310, the locking device 320 is actuated by the pulling force so as to release the engagement between the grille 310 and the front vehicle body part 100.

The grille 310 is mounted to the front vehicle body part 100 to be movable in forward and backward directions by manipulation by a user. The grille 310 may be configured to have an elongate shape, an emblem shape, or a lever shape. The shape of the grille 310 may be determined depending on the design of the front vehicle body part 100, and may be configured to have a form capable of being gripped by a user's hand.

The locking device 320 is connected both to the rear end of the grille 310 and to the rear portion of the front vehicle body part 100 to be selectively engaged. Because the locking device 320 is connected to the grille 310 and the rear portion of the front vehicle body part 100, it is possible to firmly hold the hood 110 in the closed position and to minimize lifting of the hood 110 caused by application of an impact.

The cable 330 is connected both to the grille 310 and to the locking device 320. Accordingly, when the grille 310 is moved by manipulation of the grille 310, the locking device 320 is actuated via the cable 330 by the movement of the cable 330, thereby releasing the engagement of the hood 110.

As illustrated in FIG. 3, the front end of the front vehicle body part 100 is provided with a slide space 140 in which the grille 310 is disposed so as to be movable in forward and backward directions.

In other words, the front end of the front vehicle body part 100 is provided with the slide space 140, which has a shape corresponding to the shape of the grille 310. The slide space 140 extends in forward and backward directions such that the grille 310 is movable in the slide space 140 in forward and backward directions.

The front vehicle body part 100 is provided with a guide hole portion 160 behind the slide space 140. The slide space 140 is provided therein with an elastic body 170 configured to provide elastic force to move the grille 310 forwards. The grille 310 is provided with a guide 312, which extends backwards through the guide hole portion 160. The guide 312 is provided at the end thereof with a protrusion 313, which catches on the guide hole portion 160 when the grille 310 is moved forwards by a predetermined distance.

In other words, the guide hole portion 160 extends backwards from the slide space 140, and the guide 312 extending from the grille 310 extends through the guide hole portion 160 such that the guide hole portion 160 guides the movement of the guide 312. Accordingly, the grille 310 is capable of being moved in forward and backward directions by the linear movement of the guide 312 in the guide hole portion 160.

Furthermore, because the elastic body 170 is interposed between the guide hole portion 160 and the grille 310 in the slide space 140, the grille 310 is moved forwards by the elastic force of the elastic body 170. Consequently, the grille 310 is moved forwards in the slide space 140 by the elastic body 170 in a step of preparing for an action of lifting the hood 110. When the grille 310 is manipulated in a step of lifting the hood 110, the locking device 320 is moved by the grille 310 to release the engagement of the hood 110, thereby allowing the hood 110 to be lifted.

The guide 312 of the grille 310 is provided at the end thereof with a protrusion 313. Accordingly, when the grille 310 is moved forwards by a predetermined distance, the protrusion 313 catches on the guide hole portion 160 due to the limited moving distance, thereby preventing the complete escape of the grille 310 from the slide space 140.

As illustrated in FIG. 4, the grille 310 is provided with a locking groove portion 311, and the slide space 140 in the front vehicle body part 100 is provided with a locking pin 150, which is inserted into or separated from the locking groove portion 311 as desired by a user.

As a result, the grille 310 is held in the slide space 140 in the front vehicle body part 100 or is released and moved forwards depending on whether or not the locking pin 150 is inserted into the locking groove portion 311.

The locking groove portion 311 may be formed in the rear portion of the grille 310, and the locking pin 150 is fitted into the locking groove portion 311 when the grille 310 of the front vehicle body part 100 is inserted into the slide space 140.

The locking pin 150 may be embodied as a solenoid. When the lever L (shown in FIG. 2) is manipulated as desired by a user in the passenger compartment, the locking pin 150 is separated from the locking groove portion 311, thereby allowing the grille 310 to be moved forwards in the slide space 140.

As illustrated in FIGS. 5 and 6, the locking device 320 includes a hook portion 321, to which the cable 330 is connected and which is slid by pulling force caused by forward movement of the grille 310, and a catch portion 180, which is provided at the rear end of the front vehicle body part 100 and with which the hook portion 321 is selectively engaged.

In other words, the locking device 320 is composed of the hook portion 321 and the catch portion 180. The hook portion 321 is mounted to the hood 110, and is connected to grille 310 by the cable 330 so as to be moved by the forward and backward movement of the grille 310. The catch portion 180 is mounted to the front vehicle body part 100, and is selectively engaged with the hook portion 321.

Specifically, the hook portion 321 is a solenoid, which is actuated by the cable 330, and is configured to have a pin form, and the catch portion 180 has a groove into which the pin is inserted. Accordingly, when the grille 310 is moved forwards, the cable 330 is pulled, thereby moving the hook portion 321 backwards. Consequently, the hook portion 321 is separated from the catch portion 180, thereby allowing the hood 110 to be rotated.

The hook portion 321 may be composed of a plurality of hook portions, which are provided at the lateral sides of the rear end of the hood 110. Accordingly, the catch portion 180 may be composed of a plurality of catch portions, which are provided at the lateral sides of the rear end of the front vehicle body part 100.

As illustrated in FIG. 2, because the hook portions 321 are mounted to the lateral sides of the rear end of the hood 110 and the catch portions 180 are mounted to the lateral sides of the rear end of the front vehicle body part 100, the lateral sides of the hood 110 are held by virtue of the engagement between the hook portions 321 and the catch portions 180, thereby firmly maintaining the closed state of the hood 110.

The locking device 320 further includes an actuation portion 322, which is mounted to the hood 110 and is connected to the cable 330. The actuation portion 322 is capable of causing the hook portion 321 to be moved and separated from the catch portion 180 upon application of pulling force caused by forward movement of the grille 310.

Here, the actuation portion 322 may be embodied by an actuator, and the cable 330 may be composed of a first cable 331, which is disposed between the grille 310 and the actuation portion 322 and is connected thereto, and a second cable 332, which is disposed between the actuation portion 322 and the hook portion 321 and is connected thereto.

Accordingly, when the grille 310 is manipulated so as to be moved forwards for an action of lifting the hood 110, the first cable 331 connected to the grille 310 actuates the actuation portion 322, and the actuation portion 322 pulls the second cable 332, thereby separating the hook portion 321 from the catch portion 180. In other words, when a strong force is required to separate the hook portion 321, it is difficult for a user to manipulate the grille 310. Accordingly, because the actuation portion 322 actuates the hook portion 321 when the grille 310 is manipulated by a user for an action of lifting the hood 110, convenience of a user in manipulation of the grille 310 is improved.

As illustrated in FIG. 7, the lifting unit 200 includes an elastic portion 210, which is mounted to the rear end of the front vehicle body part 100 and is in contact with the rear end of the hood 110 so as to provide elastic force to open the hood 110. The elastic portion 210 may be embodied by a spring.

Consequently, when it is desired to open the hood 110, the elastic portion 210, which is provided at the rear end of the front vehicle body part 100, pushes the hood 110 upwards using the elastic force thereof, thereby realizing an automated action of opening the hood 110. Conversely, when the hood 110 is closed, the elastic portion 210 opposes the closing force of the hood 110, thereby alleviating the impact caused by the closing action of the hood 110.

As illustrated in FIG. 8, the rear end of the front vehicle body part 100 may further be provided with a shock-absorbing rubber member 230, which is provided at the rear end of the front vehicle body part 100 and which is brought into contact with the hood 110 so as to absorb an impact when the hood 110 is closed.

The lifting action of the hood 110 is performed as follows.

As illustrated in FIG. 2, when a user manipulates the lever L in the passenger compartment in order to lift the hood 110, the locking pin 150 is separated from the locking groove portion 311. As a result, the grille 310 is moved forwards in the slide space 140 by means of the elastic body 170, thereby allowing the grille 310 to be manipulated, as illustrated in FIG. 9.

When a user pulls the grille 310 in order to lift the hood 110, the cable 330 actuates the actuation portion 322, and the actuation portion 322 actuates the hook portion 321 and thus separates the hook portion 321 from the catch portion 180. As a result, the hood 110 is opened by means of the elastic portion 210 and the lifting device 220, as illustrated in FIG. 10.

As is apparent from the above description, because the hood-integrated vehicle body according to the embodiment of the present disclosure is constructed such that the hood 110, the bumper 120, and the fender 130 are integrally formed into a single component, the weight thereof is reduced. Furthermore, the hood 110 is rotated by virtue of plastic deformation thereof, and the hood 110 is easily opened by releasing the locked state thereof.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A hood-integrated vehicle body comprising:
   a front vehicle body part;
   a hood integrally and rotatably connected to a front portion of the front vehicle body part, the hood being configured to open and close an internal space in a front part of the vehicle, and the hood being openable at a rear side;
   a lifting unit mounted to the front part of the vehicle, the lifting unit being configured to rotate the hood in a direction in which the hood is opened; and
   a locking unit mounted to the front part of the vehicle, the locking unit being configured to selectively engage the hood with the front part of the vehicle such that engagement of the hood is released to allow the hood to be opened by the lifting unit upon manipulation for opening the hood;
   wherein the locking unit includes:
      a grille mounted to the front vehicle body part, the grille being configured to move in forward and backward directions;
      a locking device mounted to the grille, the locking device being selectively engaged with the front vehicle body part; and
      a disengaging device connected to the grille and to the locking unit, the disengaging device allowing the locking unit to be disengaged from the front vehicle body part when the grille is moved forwards.

2. The hood-integrated vehicle body according to claim 1, wherein the front vehicle body part further comprises a bumper and a fender, wherein the hood, the bumper, and the fender are integrally formed from a plastic material through injection molding.

3. The hood-integrated vehicle body according to claim 1, wherein the disengaging device comprises a cable.

4. The hood-integrated vehicle body according to claim 3, wherein the front vehicle body includes a slide space at a front end, wherein grille is movable within the slide space in forward and backward directions.

5. The hood-integrated vehicle body according to claim 4, wherein the grille includes a locking groove portion, and the slide space in the front vehicle body part includes with a locking pin configured to be inserted into or separated from the locking groove portion by a user.

6. The hood-integrated vehicle body according to claim 4, wherein:
   the front vehicle body part includes a guide hole portion behind the slide space,
   the slide space includes an elastic body configured to provide elastic force for moving the grille forwards, and
   the grille includes a guide extending backwards through the guide hole portion, the guide having a protrusion formed at an end, wherein the protrusion catches on the guide hole portion when the grille is moved forwards by a predetermined distance.

7. The hood-integrated vehicle body according to claim 3, wherein the locking device includes a hook portion connected to the cable and configured to be slid by a pulling force caused by forward and backward movement of the grille, and the front vehicle body part includes a catch portion at a rear end, the catch portion being selectively engaged with the hook portion.

8. The hood-integrated vehicle body according to claim 7, wherein the hook portion includes a plurality of hook portions provided at lateral sides of a rear end of the hood, and the catch portion includes a plurality of catch portions provided at lateral sides of the rear end of the front vehicle body part.

9. The hood-integrated vehicle body according to claim 7, wherein the locking device further includes an actuation portion mounted to the hood and connected to the cable, the actuation portion being configured to move and separate the hook portion from the catch portion upon application of the pulling force caused by forward movement of the grille.

10. The hood-integrated vehicle body according to claim 1, wherein the lifting unit includes an elastic portion provided at a rear end of the front vehicle body part, and wherein the lifting unit is in contact with a rear end of the hood to provide elastic force in a direction in which the hood is opened.

11. The hood-integrated vehicle body according to claim 1, wherein the lifting unit includes a lifting device rotatably connected at one end to the front vehicle body part, and connected at an other end to the hood to push and rotate the hood when the hood is rotated in a direction in which the hood is opened.

* * * * *